United States Patent
Ikeda

[11] 3,838,911
[51] Oct. 1, 1974

[54] TELEPHOTO LENS SYSTEM
[75] Inventor: Yoshitsugi Ikeda, Tokyo, Japan
[73] Assignee: Olympus Optical Co. Ltd., Tokyo-to, Japan
[22] Filed: Apr. 24, 1973
[21] Appl. No.: 354,112

[30] Foreign Application Priority Data
July 3, 1972 Japan.................. 47-66514

[52] U.S. Cl.................. 350/223, 350/176
[51] Int. Cl.................. G02b 9/34, G02b 13/02
[58] Field of Search.................. 350/223, 176

[56] References Cited
UNITED STATES PATENTS
3,459,469  8/1969  Takahashi................ 350/223

FOREIGN PATENTS OR APPLICATIONS
28,070  9/1970  Japan................ 350/223
696,167  8/1953  Great Britain........ 350/223

*Primary Examiner*—John K. Corbin
*Attorney, Agent, or Firm*—Cushman, Darby & Cushman

[57] ABSTRACT

The present invention relates to photographic lens systems and more particularly, to a telephoto lens suitable for small size cameras for which the telephoto ratio is minimized and various aberrations are corrected favourably.

2 Claims, 9 Drawing Figures

FIG. 1
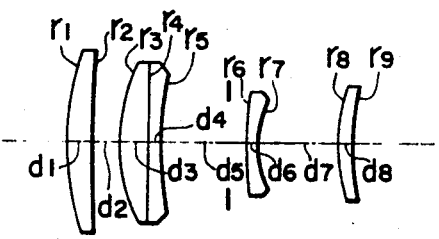
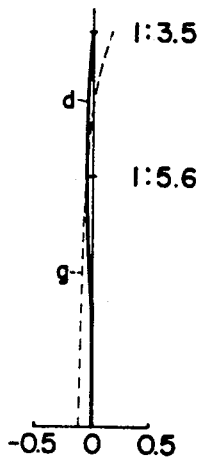
FIG. 2a
SPHERICAL ABERRATION
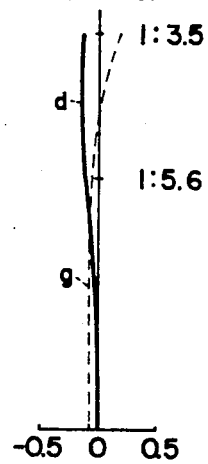
FIG. 2b
SINE CONDITION
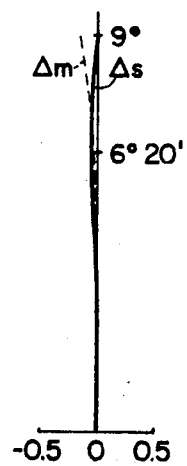
FIG. 2c
ASTIGMATISM
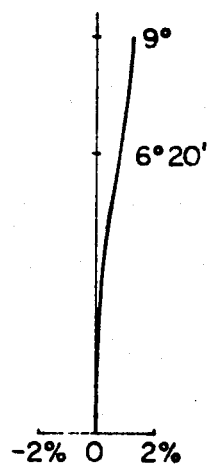
FIG. 2d
DISTORTION

SPHERICAL ABERRATION

SINE CONDITION

ASTIGMATISM

DISTORTION

TELEPHOTO LENS SYSTEM

BACKGROUND OF THE INVENTION

1. Field of the Invention

The present invention relates to photographic lens systems and more particularly, to a compact telephoto lens suitable for small size cameras.

2. Description of the Prior Art

For telephoto lenses, it is desirable to minimize the telephoto ratio (the distance from the first surface of the lens system to the back focus divided by the total focal length of the whole lens system) and, at the same time, to correct aberrations favourably. When, however, the telephoto ratio is made smaller, it becomes more difficult to correct aberrations.

SUMMARY OF THE INVENTION

It is, therefore, a principal object of the present invention to provide a telephoto lens for which the telephoto ratio is minimized and, at the same time, various aberrations are corrected favourably.

The telephoto lens according to the present invention comprises the following four lenses. That is, the first lens is a positive lens, the second lens is a cemented lens comprising a positive lens and negative lens or a combined positive meniscus lens for which two lenses are arranged with a very small airspace between each other, the third lens is a negative meniscus lens, the fourth lens is a positive meniscus lens and a stop is arranged between the second and third lenses. Besides, the telephoto lens of the present invention satisfies conditions as listed below when reference symbol $d_5$ represents the airspace between the second and third lenses, reference symbol $d_7$ represents the airspace between the third and fourth lenses, reference symbols $r_4$, $r_6$, $r_8$ and $r_9$ respecitvely represent radii of curvatures of the cemented surface of the cemented second lens and of the respective surfaces of the third and fourth lenses, reference symbols $n_2$ and $n_3$ respectively represent refractive indexes of the front positive lens and rear negative lens of the cemented second lens, and reference symbol $f$ represents the total focal length of the lens system as a whole.

1. $d_7 > 0.12f$, $|d_5 - d_7| < 0.1f$
2. $0.25f < 2r_7 < r_6 < 1.2f$
3. $0.25f < 1.3r_8 < r_9 < 2f$
4. $n_3 - n_2 > 0.05$, $(n_3 - n_2)f/|r_4| > 0.1$

For the lens system according to the present invention, the above condition (1) is required for favourably correcting chromatic aberration and offaxial aberrations. If the condition (1) is not satisfied, i.e., in case of $d_7 < 0.12f$ or $|d_5 - d_7| > 0.1f$, it becomes impossible to correct astigmatism and coma by minimizing the telephoto ratio. Besides, it becomes difficult to balance aberrations over the whole field angle. This condition also serves to minimize lateral chromatic aberration and spherical aberration for every wavelength in cooperation with the other conditions. The condition (2) is required to minimize the telephoto ratio and, at the same time, to favourably correct spherical aberration and offaxial aberrations. In case of $0.25f > 2r_7$, it may be advantageous for making the telephoto ratio small, but offaxial aberrations become unfavourable. In case of $2r_7 > r_6$, the telephoto ratio cannot be made small. Besides, in case of $r_6 > 1.2f$, satisfactory symmetry of coma cannot be achieved and it becomes impossible to correct coma even when the other factors are changed.

The condition (3) is established mainly for correcting chromatic aberration and offaxial aberrations favourably. In case of $1.3r_8 > r_9$, lateral chromatic aberration becomes unbalanced when the telephoto ratio is made small. In case of $r_9 > 2f$, it becomes difficult to correct flare caused by coma.

The condition (4) is required for favourably correcting spherical aberration and offaxial aberrations. In case it is $n_3 - n_2 < 0.05$, zonal spherical aberration increases and, moreover, it becomes inconvenient to correct coma. If it is $|r_4| > (n_3 - n_2)f/0.1f$, it becomes difficult to eliminate flare caused by coma for every wavelength.

In the following, the above-mentioned telephoto lens of the present invention is described according to the illustrated embodiments.

BRIEF DESCRIPTION OF THE DRAWINGS

FIG. 1 shows a sectional view of the embodiments of the telephoto lens according to the present invention;

FIG. 2a through FIG. 2d show graphs illustrating aberration characteristics of the embodiment 1 of the present invention.

DETAILED DESCRIPTION OF THE PREFERRED EMBODIMENTS

Numerical data of the embodiments of the present invention shown in FIG. 1 are as given below.

Embodiment 1

| | | | |
|---|---|---|---|
| $r_1 = 45.297$ | $d_1 = 4.40$ | $n_1 = 1.62041$ | $\nu_1 = 60.2$ |
| $r_2 = 355.454$ | $d_2 = 4.43$ | | |
| $r_3 = 29.103$ | $d_3 = 5.19$ | $n_2 = 1.48749$ | $\nu_2 = 69.8$ |
| $r_4 = \infty$ | $d_4 = 1.77$ | $n_3 = 1.76182$ | $\nu_3 = 26.5$ |
| $r_5 = 74.890$ | $d_5 = 14.91$ | | |
| $r_6 = 79.258$ | $d_6 = 1.79$ | $n_4 = 1.66998$ | $\nu_4 = 39.3$ |
| $r_7 = 17.670$ | $d_7 = 14.70$ | | |
| $r_8 = 33.946$ | $d_8 = 2.52$ | $n_5 = 1.80518$ | $\nu_5 = 25.4$ |
| $r_9 = 62.394$ | | | |

F 1 : 3.5%
$f = 100$
$2\omega = 18°$
$\zeta = 0.87$

Embodiment 2

| | | | |
|---|---|---|---|
| $r_1 = 50.727$ | $d_1 = 3.18$ | $n_1 = 1.62041$ | $\nu_1 = 60.2$ |
| $r_2 = \infty$ | $d_2 = 5.81$ | | |
| $r_3 = 30.358$ | $d_3 = 4.84$ | $n_2 = 1.48749$ | $\nu_2 = 69.8$ |
| $r_4 = -551.36$ | $d_4 = 2.26$ | $N_3 = 1.76182$ | $\nu_3 = 26.5$ |
| $r_5 = 65.822$ | $d_5 = 19.25$ | | |
| $r_6 = 51.530$ | $d_6 = 1.84$ | $n_4 = 1.67790$ | $\nu_4 = 55.3$ |

-Continued

Embodiment 2

$r_7 = 17.371$
$\quad d_7 = 13.42$
$r_8 = 32.302$
$\quad d_8 = 2.12 \quad n_5 = 1.78472 \quad \nu_5 = 25.6$
$r_9 = 52.334$
F 1 : 4
$f = 100$
$2\omega = 12°$
$\zeta = 0.85$ In the above numerical data, reference symbols $r_1$ through $r_9$ represent radii of curvatures of respective surfaces of lenses, reference symbols $d_1$ through $d_8$ represent thicknesses of respective lenses and spaces between lenses, reference symbols $n_1$ through $n_5$ represent refractive indexes of respective lenses, reference symbols $\nu_1$ through $\nu_5$ represent Abbe's numbers of respective lenses.

Figure 3A:
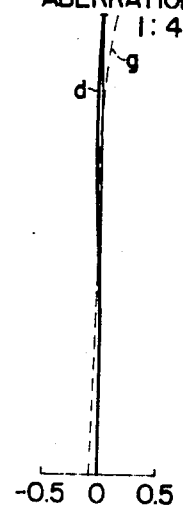
FIG. 3a through FIG. 3d show graphs illustrating aberration characteristics of the embodiment 2 of the present invention.
Figure 3B:
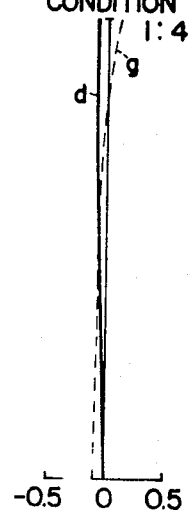
Figure 3C:
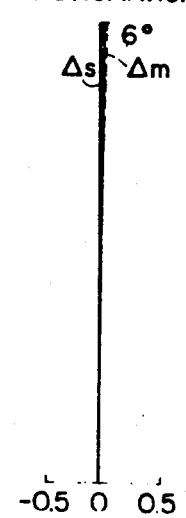
Figure 3D:
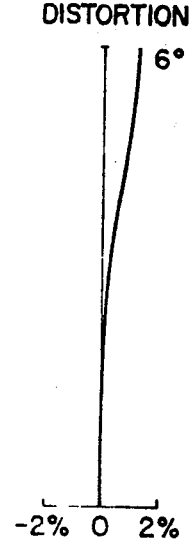

FIG. 2a through FIG. 2d show aberration characteristics curves for the embodiment 1 of the telephoto lens according to the present invention. FIG. 2a shows spherical aberration, FIG. 2b shows the sine condition, FIG. 2c shows astigmatism and FIG. 2d shows distortion. FIG. 3a through FIG. 3d show aberration characteristics curves for the embodiment 2 of the present invention. FIG. 3a shows spherical aberration, FIG. 3b shows the sine condition, FIG. 3c shows astigmatism and FIG. 3d shows distortion.

As it is evident from the above-mentioned graphs of aberration characteristics curves of the embodiments 1 and 2, the present invention provides a telephoto lens for which the telephoto ratio is minized and various aberrations are corrected quite favourably.

I claim:

1. A telephoto lens system comprising a first lens, a second doublet lens, a third lens and a fourth lens, wherein said first lens is a positive lens, said second doublet lens is a cemented positive lens comprising positive and negative lenses, said third lens is a negative meniscus lens and said fourth lens is a positive meniscus lens, and said telephoto lens system having the following numerical data:

$r_1 = 45.297$
$\quad d_1 = 4.40 \quad n_1 = 1.62041 \quad \nu_1 = 60.2$
$r_2 = 355.45$
$\quad d_2 = 4.43$
$r_3 = 29.103$
$\quad d_3 = 5.19 \quad n_2 = 1.48749 \quad \nu_2 = 69.8$
$r_4 = \infty$
$\quad d_4 = 1.77 \quad n_3 = 1.76182 \quad \nu_3 = 26.5$
$r_5 = 74.890$
$r_6 = 79.258$
$\quad d_5 = 14.91$
$r_7 = 17.670$
$\quad d_6 = 1.79 \quad n_4 = 1.66998 \quad \nu_4 = 39.3$
$\quad d_7 = 14.70$
$r_8 = 33.946$
$\quad d_8 = 2.52 \quad n_5 = 1.80518 \quad \nu_5 = 25.4$
$r_9 = 62.394$
F 1 : 3.5
$f = 100$
$2\omega = 18°$
$\zeta = 0.87$ where reference symbols $r_1$ through $r_9$ represent radii of curvatures of respective surfaces of lenses, reference symbols $d_1$ through $d_8$ represent thicknesses of respective lenses and spaces between lenses, reference symbols $n_1$ through $n_5$ represent refractive indexes of respective lenses, reference symbols $\nu_1$ through $\nu_5$ represent Abbe's numbers of respective lenses.

2. A telephoto lens system comprising a first lens, a second doublet lens, a third lens and a fourth lens, wherein said first lens is a positive lens, said second lens is a cemented positive lens comprising positive and negative lenses, said third lens is a negative meniscus lens and said fourth lens is a positive meniscus lens, and said telephoto lens system having the following numerical data:

$r_1 = 50.727$
$\quad d_1 = 3.18 \quad n_1 = 1.62041 \quad \nu_1 = 60.2$
$r_2 = \infty$
$\quad d_2 = 5.81$
$r_3 = 30.358$
$\quad d_3 = 4.84 \quad n_2 = 1.48749 \quad \nu_2 = 69.8$
$r_4 = -551.36$
$\quad d_4 = 2.26 \quad n_3 = 1.76182 \quad \nu_3 = 26.5$
$r_5 = 65.822$
$\quad d_5 = 19.25$
$r_6 = 51.530$
$\quad d_6 = 1.84 \quad n_4 = 1.67790 \quad \nu_4 = 55.3$
$r_7 = 17.371$
$\quad d_7 = 13.42$
$r_8 = 32.302$
$\quad d_8 = 2.12 \quad n_5 = 1.78472 \quad \nu_5 = 25.6$
$r_9 = 52.334$
F 1 : 4
$f = 100$
$2\omega = 12°$
$\zeta = 0.85$ where reference symbols $r_1$ through $r_9$ represent radii of curvatures of respective surfaces of lenses, reference symbols $d_1$ through $d_8$ represent thicknesses of respective lenses and spaces between lenses, reference symbols $n_1$ through $n_5$ represent refractive indexes of respective lenses, reference symbols $\nu_1$ through $\nu_5$ represent Abbe's numbers of respective lenses.

* * * * *